United States Patent
Klauder et al.

[19]

[11] Patent Number: 5,804,736
[45] Date of Patent: Sep. 8, 1998

[54] DIFFERENTIAL CAPACITIVE TRANSDUCER

[75] Inventors: Philip R. Klauder, Ambler; James O. Moore, Worcester; Christopher J. O'Brien, New Britain, all of Pa.

[73] Assignee: Moore Products Co., Spring House, Pa.

[21] Appl. No.: 790,253

[22] Filed: Jan. 27, 1997

Related U.S. Application Data

[63] Continuation of Ser. No. 661,851, Jun. 11, 1996.

[51] Int. Cl.⁶ .................................................. G01L 9/12
[52] U.S. Cl. .............................................. 73/724; 73/706
[58] Field of Search .......................... 73/706, 708, 718, 73/724; 361/283.1, 283.3

[56] References Cited

U.S. PATENT DOCUMENTS

| | | | |
|---|---|---|---|
| 4,187,460 | 2/1980 | Dauge et al. | 324/60 CD |
| 4,257,274 | 3/1981 | Shimada et al. | 73/718 |
| 4,289,035 | 9/1981 | Lee | 73/708 |
| 4,422,335 | 12/1983 | Ohnesorge et al. | 73/724 |
| 4,539,850 | 9/1985 | Ziegler | 73/706 |
| 4,542,435 | 9/1985 | Freud et al. | 361/283 |
| 4,565,096 | 1/1986 | Knecht | 73/718 |
| 4,625,560 | 12/1986 | Sanders | 73/718 |
| 4,644,798 | 2/1987 | Tamura et al. | 73/708 |
| 4,730,496 | 3/1988 | Knecht et al. | 73/724 |
| 4,735,098 | 4/1988 | Kavli et al. | 73/718 |
| 4,794,320 | 12/1988 | Chang | 324/60 |
| 4,852,408 | 8/1989 | Sanders | 73/718 |
| 4,864,463 | 9/1989 | Shkedi et al. | 361/283 |
| 4,944,187 | 7/1990 | Frick et al. | 73/718 |
| 5,022,270 | 6/1991 | Rud, Jr. | 73/718 |
| 5,311,452 | 5/1994 | Yokota et al. | 73/4 R |
| 5,377,524 | 1/1995 | Wise et al. | 73/4 R |
| 5,420,578 | 5/1995 | O'Brien et al. | 340/870.13 |

FOREIGN PATENT DOCUMENTS

| | | |
|---|---|---|
| 59-30035 | 2/1984 | Japan . |
| 1-61641 | 3/1989 | Japan . |

*Primary Examiner*—William L. Oen
*Attorney, Agent, or Firm*—Seidel, Gonda, Lavorgna & Monaco, PC

[57] ABSTRACT

A pressure transducer having a redundant fluid pressure sensor can be used to determine if the pressure transducer needs to be recalibrated. The pressure transducer comprises a fluid pressure sensor for measuring differential pressure. The fluid pressure sensor includes a pair of substantially identical pressure sensors for providing a variable electrical output as a function of a differential fluid pressure and a reference sensor for providing an electrical output independent of the differential fluid pressure. A conditioning circuit is provided for generating a frequency-based signal whose frequency is a function of the electrical output for each fluid pressure sensor. The electrical output of the first and second pressure sensors can be compared to determine whether the pressure transducer needs to be calibrated. In one embodiment, the pressure sensors comprise variable capacitors. The first and second capacitors each have one fixed plate and one movable plate responsive to differential fluid pressure across the movable plate. The reference capacitor has two fixed plates. The first variable, second variable, and reference capacitors are all located in proximity to one another and in communication with the differential fluid pressure. The pressure transducer also includes a switching network connected to the capacitors for selectably connecting at least one of the capacitors to an electronic circuit.

17 Claims, 10 Drawing Sheets

DIFFERENTIAL CAPACITIVE TRANSDUCER

This is a divisional of copending application Ser. No. 08/661,851, filed on Jun. 11, 1996.

BACKGROUND OF THE INVENTION

1. Field of the Invention

The present invention relates to a pressure transducer system including a pressure sensor for accurately measuring such parameters as temperature, differential, absolute, and gauge pressures, and which is capable of detecting defects in the pressure sensor. The system includes a redundant pressure sensor and its associated circuitry.

2. Background of the Invention

Pressure transducers used to measure the pressure of a process fluid flowing through a pipe are known in the art. Pressure transducers are used in highly sensitive environments such as refineries, the aerospace industry, and power plants. The accurate detection of flow conditions is critical in ensuring the operation and safety of the processes in these and other industries.

Most pressure transducers are generally contained in a housing containing an inert transfer medium which isolates the process fluid being measured from the pressure sensor itself. The housing provides the sensor with resistance to corrosion which may be caused by the process fluid. Pressure is transmitted via the transfer medium to the isolated pressure sensor through diaphragms located on the housing. The diaphragms separate the process fluid from the transfer medium while permitting pressure to be transmitted to the sensor.

Pressure transducers are typically required to have their stability verified at periodic intervals to ensure that their calibration has not changed especially in critical applications. The most likely calibration problems affecting pressure transducers are span shift and zero shift. Span shift occurs when the pressure sensitivity of the pressure sensor is no longer accurate within the normal range of operating pressures. Usually, the pressure sensitivity of the affected pressure sensor varies within the operating range. Typically, a "five valve" or a "three valve" manifold, known in the art, is used to verify the accuracy of a pressure sensor affected by span shift.

In contrast, zero shift occurs when all of the pressure sensor readings are off by some constant error value. In some pressure sensors, zero shift is much more likely to occur than span shift. Therefore, for these pressure sensors it is acceptable to check the pressure sensor only at the zero condition and compensate for any detected error shift. For example, if the pressure sensor has a reading of 1 psi at the zero condition, recalibrating the sensor would only require subtracting 1 psi from all future readings of the pressure sensor.

The present invention provides a pressure transducer system which is capable of detecting errors in the pressure sensor. Upon detection of an error, a "three valve" manifold can be used to pinpoint the cause of the error and compensate for it.

SUMMARY OF THE INVENTION

The present invention relates to a pressure transducer having a redundant pressure sensor. The redundant pressure sensor is used to sense the differential pressure of a process fluid and to determine whether the pressure transducer needs to be recalibrated due to the presence of a zero shift condition. The pressure sensor includes first and second variable pressure sensors each for providing a variable electrical output as a function of a differential fluid pressure.

A conditioning circuit is used for generating a first frequency based signal whose frequency is a function of the electrical output of the first variable pressure sensor and a second frequency based signal whose frequency is a function of the electrical output of the second variable pressure sensor. A microprocessor or error detecting circuit can be provided for determining whether the difference between the first signal and the second signal is within a preselected range.

The pressure sensors can be formed either as a single monolithic structure or as separate structures. The sensors are contained in a housing which isolates the process fluid, which is being measured by the pressure sensor, from the sensor itself. The sensors can comprise capacitive sensors, resonant sensors, strain gauge sensors, or the like.

In one embodiment, the first and second variable pressure sensors are variable capacitors. The first and second capacitors each have one fixed plate and one movable plate responsive to differential fluid pressure across the movable plate. A reference capacitor can also be provided. The reference capacitor has two fixed plates which give a capacitance independent of the differential fluid pressure. The first variable, second variable, and reference capacitors are all located in proximity to one another and in communication with the differential fluid pressure.

The pressure transducer can also include a switching network connected to the pressure sensors for selectably connecting at least one of the sensors to an interface circuit. The interface circuit has inputs connected to the switching network for generating a frequency-based signal whose frequency is a function of the electrical output of the at least one pressure sensor connected to the interface circuit through the switching network.

The number of cycles in the frequency based signal transmitted from the interface circuit is counted by a frequency counter which transmits the number to a controller. The capacitance of the first and second capacitors, as reflected in the frequency based signal, are compared by the controller to determine whether the pressure transducer needs to be calibrated. A "three valve" manifold can be provided to apply a zero differential pressure to the pressure sensor. In this manner, the precise condition of the pressure sensor can be determined without taking the pressure transducer out of service.

A method for detecting defects in a fluid pressure sensor is also comprehended by the invention. The method includes measuring an applied differential pressure using a pressure transducer having a fluid pressure sensor comprising first and second variable pressure sensors for providing an electrical output as a function of an applied differential fluid pressure, the first and second pressure sensors being substantially identical; applying a differential fluid pressure to the first and second pressure sensors via a valve; generating a first signal whose frequency is proportional to the electrical output of the first variable pressure sensor and a second signal whose frequency is proportional to the electrical output of the second variable pressure sensor; determining whether the difference between the first signal and the second signal is within a preselected range; and determining whether the sensor is damaged based upon whether the second signal is outside the limits of the preselected range.

BRIEF DESCRIPTION OF THE DRAWINGS

For the purpose of illustrating the invention, there is shown in the drawings a form which is presently preferred.

it being understood, however, that this invention is not limited to the precise arrangements and instrumentalities shown.

DESCRIPTION OF THE PREFERRED EMBODIMENT

Figure 1:
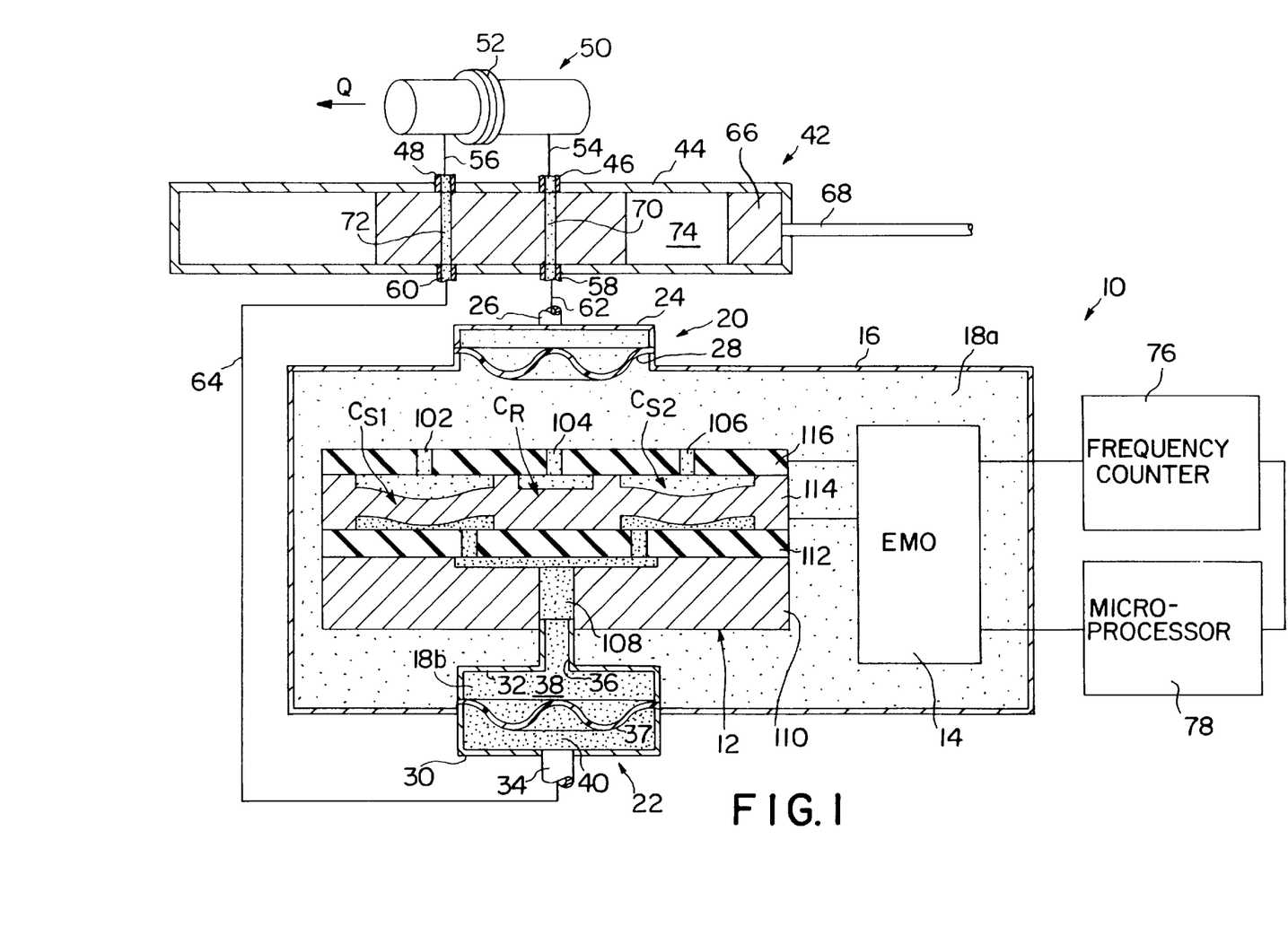
FIG. 1 is a schematic view, shown partially in cross-section, of a pressure transducer system having a "three valve" manifold in a first position in accordance with the present invention.

In the drawings, where like numerals identify like elements, there is shown a form of the present invention which is presently preferred. In FIG. 1 there is schematically shown a pressure transducer device 10 for accurately measuring differential, absolute, and gauge pressures and temperature of a process fluid. The device 10 includes a capacitive pressure sensor 12 and an interface circuit 14 electrically connected to the sensor 12. In the embodiment shown, the sensor 12 is a redundant dual silicon capacitor sensor. By using a redundant sensor, the device is able to detect the presence of sensor defects, or damage, which could cause measurement inaccuracies without taking the pressure transducer out of service The sensor 12 is in fluid communication with a process fluid stream 50 and includes a plurality of capacitors $C_{S1}$, $C_{S2}$, and $C_R$ for measuring the pressure and temperature of the fluid in the processes stream 50. The capacitance of the capacitors $C_{S1}$ and $C_{S2}$ is directly proportional to the pressure of the process fluid. The interface circuit 14, called an extended mode oscillator (EMO) circuit, is connected to the sensor 12 and converts the capacitance of each capacitor $C_{S1}$, $C_{S2}$, and $C_R$ into a signal whose frequency is proportional to the pressure of the process fluid. In the embodiment shown, the EMO circuit 14 is interfaced directly to an external frequency counter 76, which samples the signal transmitted by the EMO circuit 14, and an external controller 78, such as a microprocessor or the like, which calculates the actual pressure of the process fluid.

The sensor 12 and the EMO circuit 14 are mounted within a sealed housing 16 which isolates the sensor 12 from the possibly corrosive effects of the process fluid stream 50. The housing 16 is filled with inert pressure transfer media 18a and 18b which transfer the pressure of the process fluid to the sensor 12. The transfer media 18a and 18b typically comprise silicon oil, which allows the entire assembly to exhibit virtually no mechanical hysteresis.

A first chamber 20 and a second chamber 22 are formed in the walls of the housing 16. The first chamber 20 has an outer wall 24 and an inlet port 26 formed thereon. A seal diaphragm 28 is secured within the first chamber 20 and functions as an inner surface of the first chamber 20.

The second chamber 22 includes an outer wall portion 30 and an inner wall portion 32. An inlet 34 is formed on the outer wall portion 30 and a conduit 36 extends from the inner wall portion 32. A seal diaphragm 37 is secured within the second chamber 22 and separates the second chamber 22 into an inner second chamber 38 and an outer second chamber 40.

The seal diaphragms 28 and 37 are preferably fabricated from Hastelloy®, Monel® metal, tantalum, stainless steel, or the like.

The sensor 12 includes a base plate 110, an intermediate plate 112, an intermediate plate 114, and a cap plate 116. A plurality of openings 102, 104, and 106 are formed in the cap plate 116 and permit fluid communication with a portion of the interior of the sensor 12 between plates 116 and 114. As such, the fluid 18a contained in the housing 16 fills the portion of the sensor between plates 116 and 114 through the openings 102, 104, and 106.

Similarly, an opening 108 is formed in the base plate 110 and permits fluid communication with a portion of the interior of the sensor 12 between plates 110 and 114. The sensor 12 is mounted in the housing 16 so that conduit 36 is received in the opening 108. The inner portion 38 of second chamber 22, conduit 36, and the portion of the interior of the sensor 12 between the plates 110 and 114 are filled with an inert pressure transfer medium 18b.

The pressure transducer device 10 is also provided with a "three valve" manifold 42 which allows the pressure transducer 10 to be calibrated and remotely zeroed without taking it out of service. The valve manifold 42 comprises a housing 44 having a first inlet port 46 and a second inlet port 48 fluidly connected in the usual manner to a process fluid, such as across an orifice plate 52 of a process fluid stream 50, as shown in FIG. 1, by fluid lines 54 and 56, respectively. It is understood that the process fluid may be used in any fluid process such as gas or liquid storage tank, gas or liquid pipe, pitot tube, a calibrated restriction for measuring flow, or the like.

The valve manifold 42 is also provided with a first outlet port 58 and a second outlet port 60 aligned with the first inlet port 46 and second inlet port 48, respectively. The first outlet port 58 is in fluid communication with the first inlet 26 via fluid line 62. Similarly, the second outlet port 60 is in fluid communication with the second inlet 34 via fluid line 64.

A movable inner valve member 66 is disposed within the valve manifold housing 44. An external actuator 68 is connected to the valve member 66 for moving the valve member 66 between a first position, shown in FIG. 1, and a second position, shown in FIG. 2. The valve member 66 is provided with a first bore 70 and a second bore 72 extending through valve member 66. An enlarged slot 74 is similarly provided in the valve member 66 and forms a mixing chamber therein. It is contemplated that the valve manifold 42 be automated and remotely controlled from the pressure transducer 10 via a controller (not shown) connected to the external actuator 68.

When the valve member 66 is in the first position (FIG. 1), the first bore 70 is aligned with both the first inlet 46 and the first outlet 58, forming a passageway from the process fluid stream 50 through the housing 44 and the valve member 66 to inlet port 26 of first chamber 20. At the same time, the second bore 72 is aligned with both the second inlet 48 and the second outlet 60, forming a passageway from the process fluid stream 50 to inlet 34 of second chamber 22. When the valve member 66 is in the second position (FIG. 2), the enlarged radial slot 74 is aligned with both the first inlet and outlet 46 and 58 and also the second inlet and outlet 58 and 60, forming a common mixing chamber within the valve manifold 42.

Figure 2:
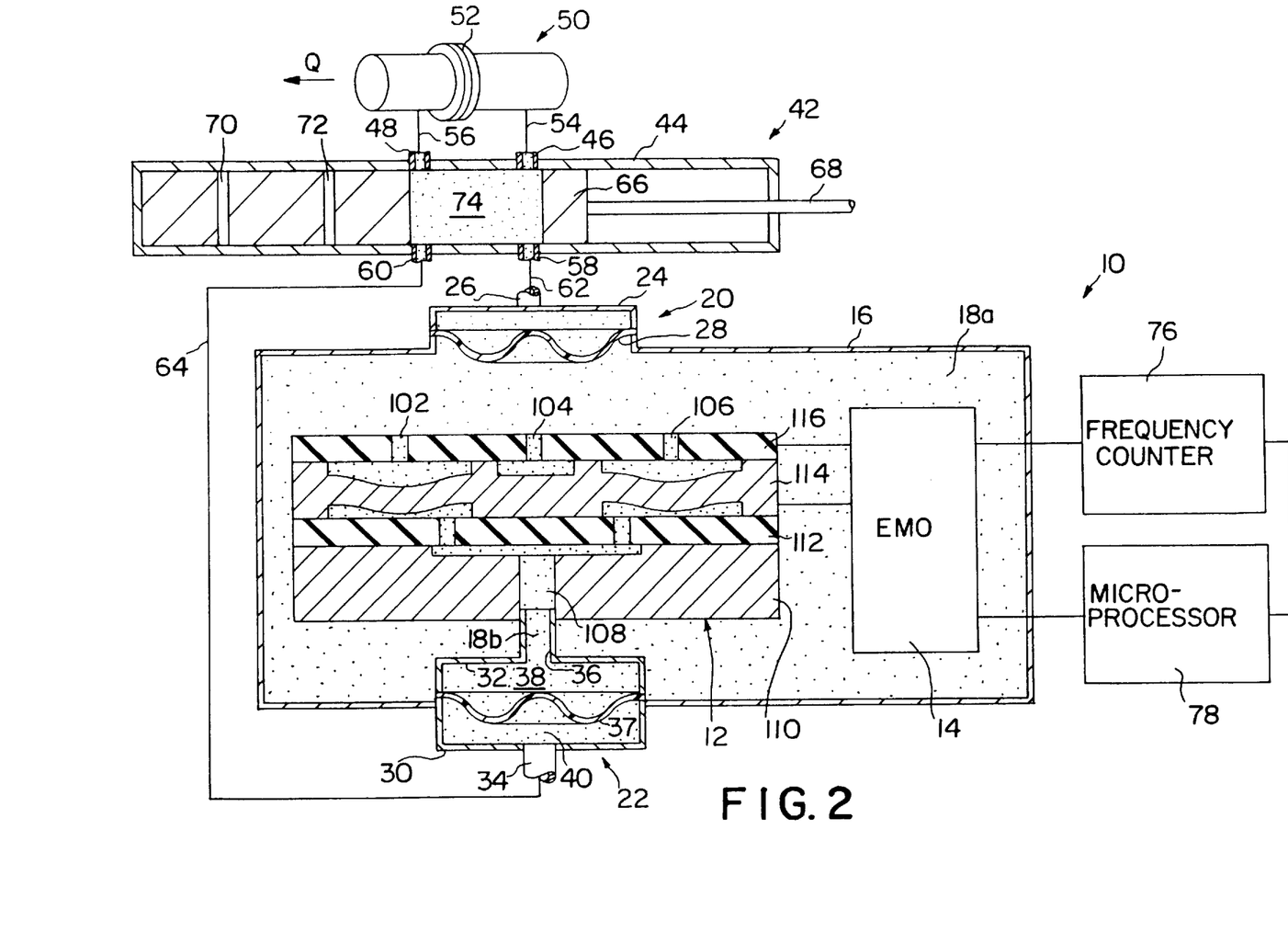
FIG. 2 is a schematic view of the pressure transducer system of FIG. 1 having the "three valve" manifold in a second position.

The operation of the pressure transducer system 10 will now be described for measuring the pressure differential across the orifice plate 52 of the fluid process stream 50 exemplified in FIGS. 1 and 2.

In fluid process stream 50, fluid flowing in the direction indicated by arrow Q creates a pressure drop across the orifice plate 52. On the upstream side of the orifice plate 52, the fluid has a high pressure, $P_H$, while on the downstream side, the fluid has a lower pressure, $P_L$.

When the valve member 66 is in the first, or normal, position (FIG. 1), the first passageway 70 interconnects the fluid line 54 (connected to the upstream side of the orifice plate 52) and the first chamber 20. Similarly, the second passageway 72 interconnects the fluid line 56 (connected to the downstream side of the orifice plate 52) and the outer portion 40 of the second chamber 22. The fluid in the upstream circuit 54, 70, 62 will exert the upstream pressure, $P_H$, on the seal diaphragm 28 of the first chamber 20, which transmits the upstream pressure, $P_H$, to the inert pressure transfer medium 18a contained in the housing 16. Similarly, the fluid in the downstream circuit 56. 72, 64 will exert the downstream pressure, $P_L$, on the seal diaphragm 37 of the second chamber 22, which transmits the downstream pressure, $P_L$, to the inert pressure transfer medium 18b contained in the inner chamber portion 38. Thus, the upstream pressure, $P_H$, is transmitted to the interior of the pressure sensor 12 through openings 102 and 104, and the downstream pressure, $P_L$, is transmitted to the interior of the pressure sensor 12 through opening 108. Therefore, as is more fully described below in connection with FIGS. 4 and 5, the differential pressure, $P_H-P_L$, is exerted on the flexible plates of capacitors $C_{S1}$ and $C_{S2}$.

The capacitance of the capacitors $C_{S1}$ and $C_{S2}$ is proportional to the differential pressure, $P_H-P_L$. The EMO circuit 14 converts this capacitance to a square-wave signal whose period (and frequency) is proportional to the differential pressure, $P_H-P_L$.

The controller 78 then calculates the true pressure differential across the orifice plate 52 based on the number of pulses counted by the frequency counter 76. The complete operation of the pressure transducer 10 is described in detail below in connection with the FIGS. 6–10.

When the valve member 66 is in the second, or test, position (FIG. 2) the enlarged slot 74 connects the fluid lines 54 and 56, and the pressure of the fluid in the slot 74 is at the same pressure, $P_E$ (i.e., $P_H$ is equal to $P_L$). Since the slot 74 is connected to the fluid lines 62 and 64, the fluid contained therein exerts the pressure, $P_E$, on both seal diaphragms 28 and 37. Therefore, the pressure transmitted to the pressure sensor 12 through the openings 102, 104, 106, and 108 is the pressure, $P_E$. Thus, when the valve member 66 is in the second position, there is a zero differential pressure exerted on the pressure sensor 12 and, the pressure differential calculated by the controller 78 is therefore also zero. The second position (FIG. 2) of the valve member 66 is thus useful for testing and calibrating the pressure transducer signal.

Figure 3:
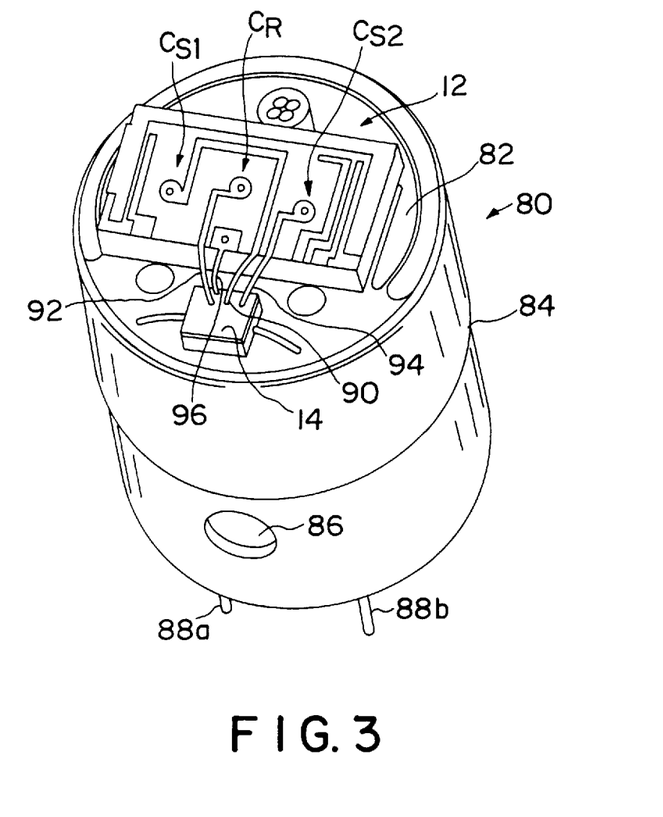
FIG. 3 is a perspective view of a pressure transducer in accordance with the present invention, showing constructional features.

In FIG. 3, a preferred physical embodiment of the capacitive pressure sensor 12 and EMO circuit 14 is shown mounted to a header assembly 80. The header assembly 80 includes a header plate 82 and a header body 84 for mounting or bonding the sensor 12 and the EMO circuit 14 to the housing 16 (not shown). The EMO circuit 14 is preferably mounted proximate the sensor 12 on the header plate 82 to reduce the physical size of the header assembly 80, limit any undesirable capacitor fluctuations (e.g., parasitic capacitances due to the length of environmentally exposed leads). and minimize the effects caused by temperature gradients, so that temperature variations will affect all the capacitors equally. The header body 84 is preferably fabricated from a stainless steel material or the like which provides corrosion resistance and weldability, and functions to isolate the sensor 12 and EMO circuit 14 from mechanical stresses and external electrical interference.

Figure 9:
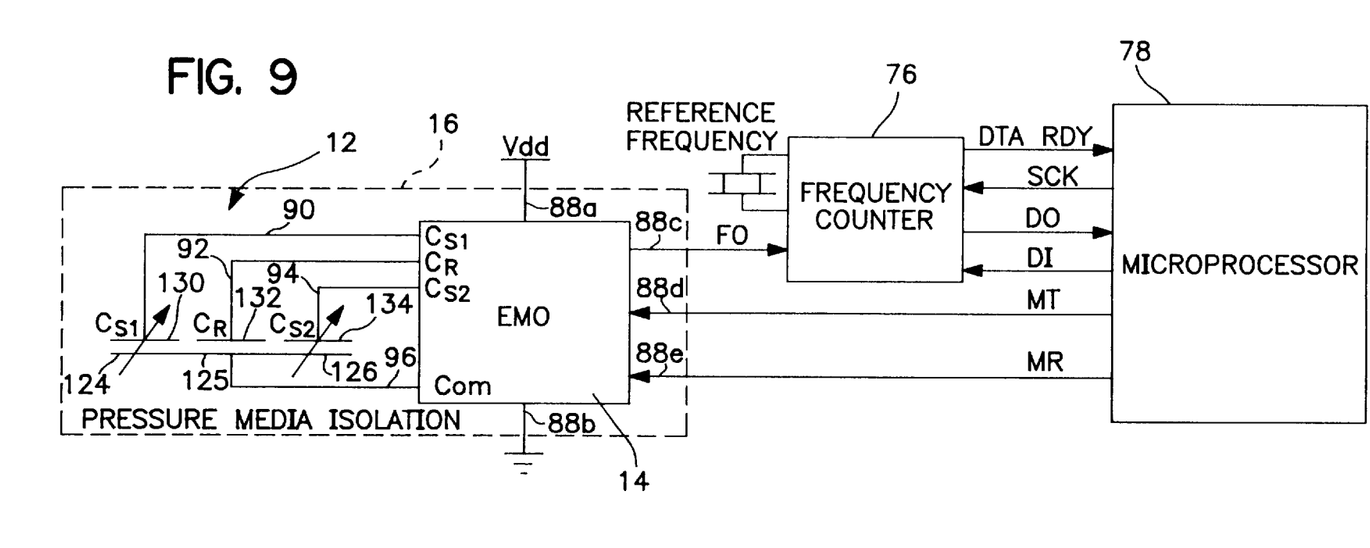
FIG. 9 is a schematic view of the external connections to the pressure transducer.

The capacitors $C_{S1}$, $C_R$, and $C_{S2}$ of the sensor 12 are electrically connected to the EMO circuit 14 by leads 90, 92, 94, and 96, respectively. The header assembly 80 typically has five leads 88a–e (only leads 88a and 88b are shown in FIG. 3) extending from the header body 84. As seen in FIG. 9, lead 88a connects to the power line $V_{dd}$, lead 88b connects to the ground line, lead 88c connects to line FO, lead 88d connects to line MT, and lead 88e connects to line MR. An opening 86 is also formed on a side wall of the header body 84 and provides fluid communication with the opening 108 of the sensor 12.

Figure 4:
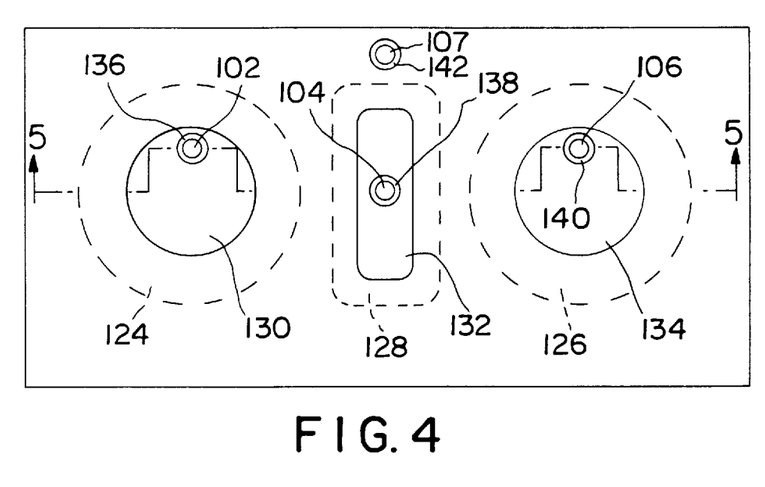
FIG. 4 is a top view of a pressure sensor in accordance with the present invention.
Figure 5:
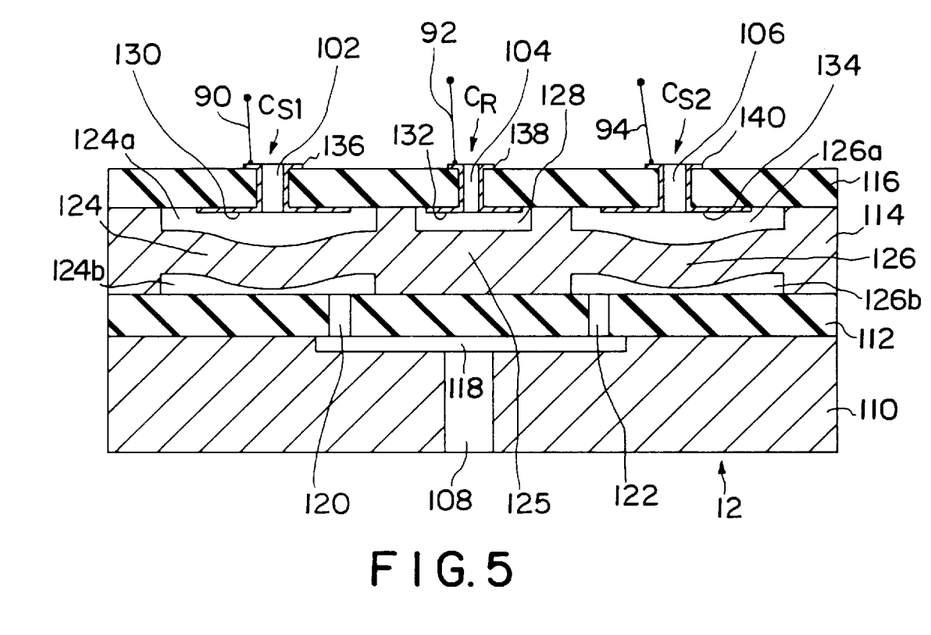
FIG. 5 is a sectional view taken along line 5—5 of FIG. 4.

The capacitive pressure sensor 12 is shown in more detail in FIGS. 4 and 5. In the embodiment shown, the sensor 12 has a monolithic structure similar to a semiconductor chip and is manufactured by a batch process which creates sensors having closely matching characteristics. The sensor 12, however, is a passive device. The monolithic structure permits the use of a common capacitor plate 114 for all three the capacitors $C_{S1}$, $C_{S2}$, and $C_R$. Additionally, the proximity of the capacitors to each other and their construction on a common plate reduces the effect of temperature gradients because temperature affects all the capacitors equally. The monolithic structure also reduces the manufacturing cost of the sensor 12 and the marginal cost of adding additional capacitors.

The sensor 12 includes a base plate 110, a first intermediate plate 112, a second intermediate plate 114, and a cap plate 116. The base plate 110 has an opening 108 extending therethrough and a channel 118 formed in one face of the plate 110, which communicates with the opening 108. The base plate 110 is attached to the header plate 82, preferably by anodic bonding. The plate 110 is preferably composed of a semiconductor substrate, such as doped silicon material, which reduces thermal stress on the plate 114 and provides electrical shielding for the sensor 12.

The intermediate plate 112 is attached to the base plate 110, preferably by anodic bonding. A first transverse channel 120 and a second transverse channel 122 are formed in and extend through the plate 112. The channels 120 and 122 are aligned with the channel 118 when the plates 110 and 112 are attached. The plate 112 is preferably a dielectric material, such as Pyrex® glass or borosilicate glass, which allows the plate 112 to be anodically bonded to the silicon plate 110, provides electrical isolation between plate 110 and plate 114. The plate 112 has a preferable thickness of approximately 10 mils.

The intermediate plate 114 is attached to the plate 112, preferably by anodic bonding. The plate 114 has a plurality of flexible circular portions 124 and 126 formed therein and an elongated slot 128 formed in one surface of portion 125 of the plate 114. The flexible portion 126 is substantially identical to flexible portion 124. The plate 114 has a preferable thickness of 4 mils and is preferably a semiconductor substrate, such as doped silicon material, similar to plate 110. The flexible portions 124 and 126 are formed by thinning (e.g., etching or micro-machining) both faces of the plate 114.

The plate 114 forms a common capacitor plate for the variable capacitors $C_{S1}$ and $C_{S2}$ and fixed reference capacitor $C_R$. As such, the flexible portions 124 and 126 and fixed portion 125 are electrically connected, since they are formed from the same silicon semiconductor material of plate 114. The flexible portion 124 comprises one of the movable plates of capacitor $C_{S1}$, the flexible portion 126 comprises one of the movable plates of capacitor $C_{S2}$, and the fixed portion 125 comprises one of the fixed plates of capacitor $C_R$. The thickness and diameter of the flexible plates 124 and 126 are selected depending upon the desired sensitivity of the variable capacitors $C_{S1}$ and $C_{S2}$.

The thinned flexible portion 124 creates an upper cavity 124a above the flexible portion 124 and a lower cavity 124b below the flexible portion 124. Similarly, the thinned flexible portion 126 creates an upper cavity 126a above the flexible portion 126 and a lower cavity 126b below the flexible portion 126. The lower cavity 124b is aligned with the channel 120, and the lower cavity 126b is aligned with the channel 122 when the plate 114 is positioned on the plate 112.

The cap plate 116 is attached to the common plate 114, preferably by anodic bonding. The transverse openings 102, 104, and 106 are formed in and extend through the plate 116. The openings 102, 104, 106 are aligned with the upper cavity 124a, the groove 128, and the upper cavity 126a, respectively when the plate 116 is positioned on the plate 114. Another transverse opening 107 is formed in plate 116 adjacent one side edge. The plate 116 is preferably composed of a dielectric material, such as pyrex® glass or borosilicate glass, which allows the plate 116 to be anodically bonded to the silicon plate. The plate 116 has a preferable thickness of approximately 15 mils.

Figure 6:
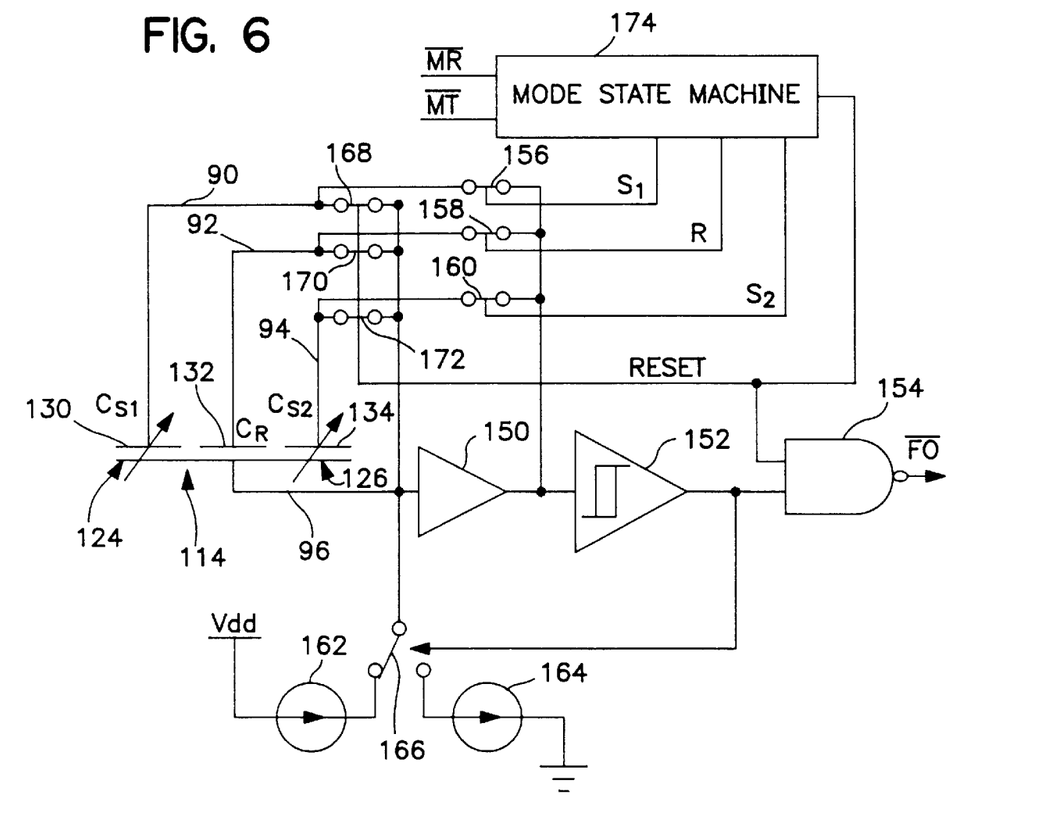
FIG. 6 is a schematic wiring diagram of the pressure transducer.

A metal terminal 142 is formed on the outer surface of plate 116 on opening 107. The terminal 142 is electrically connected to the EMO circuit 14 through a lead line 96 (FIG. 6). Opening 107 is metalized to connect the common capacitor plate 114 to terminal 142, providing electrical contact with the EMO circuit 14, and forms a common electrode for all three capacitors.

Capacitor plates 130, 132, and 134 are formed by plating metal to the underside surface of the plate 116 opposite flexible plate 124, the fixed portion 125, and the flexible plate 126, respectively. Openings 102, 104, and 106 are metalized to connect plates 130, 132, and 134 to terminals 136, 138, and 140, respectively on the top surface of plate 116. The terminals 130, 132, and 134 are connected to the EMO circuit 14 through leads 90, 92, and 94, respectively (FIG. 3). Thus, the capacitor plates 130, 132, and 134 form the second capacitor plates of capacitors $C_{S1}$, $C_R$, and $C_{S2}$, respectively.

Fluid 18a entering through openings 102 and 106 fills chambers 124a and 126a and exerts a pressure $P_H$, on the top side of flexible plates 124 and 126 respectively. Similarly, fluid 18b entering opening 108, channel 118, and channels 120 and 122 fills chambers 124b and 126b and exerts a pressure $P_L$, on the bottom side of movable plates 124 and 126, respectively. The flexible plates 124 and 126 deflect under the influence of the two pressures, $P_H$ and $P_L$. Since the flexible plates 124 and 126 form one of the plates of capacitors $C_{S1}$ and $C_{S2}$, respectively, the deflection of the flexible plates 124 and 126 changes the distance between the plates of the variable capacitors $C_{S1}$ and $C_{S2}$.

The capacitance of each capacitor is related to the distance between the plates of each capacitor by:

$$C = \frac{kA}{d}$$

where

C is the capacitance, k is a constant,

A is the area of the plate, and d is the distance between the plates.

Thus, the capacitance C of each capacitor is inversely proportional to the distance, d, between the plates of each capacitor. That distance is proportional to the differential pressure, $P_H$-$P_L$.

The EMO circuit 14 detects the capacitance across the top plate 130 and bottom plate 124 of capacitor $C_{S1}$ and across the top plate 134 and bottom plate 126 of capacitor $C_{S2}$. The capacitance of capacitors $C_{S1}$ and $C_{S2}$ should be substantially the same because the structure of the capacitors and the pressures exerted on each are substantially identical. If the capacitance, detected by the EMO circuit 14, of each capacitor $C_{S1}$ and $C_{S2}$ is not the same, then it is reasonable to conclude that one of the capacitors is probably damaged.

In a similar manner, fluid 18a entering through opening 104 fills groove 128. However, since the fixed portion 125 of the common capacitor plate 114 directly across from the top plate 132 is solid and inflexible (as compared to flexible plates 124 and 126), the fluid 18a in groove 128 does not cause portion 125 of the silicon plate 114 to deflect. Therefore, the capacitance of the fixed capacitor $C_R$ is constant regardless of the pressure of fluid 18a. Thus, capacitor $C_R$ can be used to compensate for temperature variations and static pressure effects which affect the operation of the sensor 12, reducing analog sensing errors. Since all the capacitors are affected equally by static pressure and temperature effects and only the capacitors $C_{S1}$ and $C_{S2}$ are affected by differential pressure, these effects can be compensated for by comparing the ratio of each capacitor $C_{S1}$ and $C_{S2}$ against the capacitor $C_R$.

In FIG. 6, a schematic block diagram of the EMO interface circuit 14 and sensor 12 is shown. The EMO circuit 14 is capable of oscillating over a wide frequency range, with the actual frequency depending on the amount of frequency-controlling capacitance actively connected in the circuit. The actual frequency is governed by:

$$f = \frac{1}{Rc}$$

where
   $f$ is the frequency of the signal,
   R is the fixed resistance of the circuit,
   C is the capacitance of the capacitor.

Thus, the output signal of the EMO circuit 14 has a period (and frequency) which is proportional to the differential pressure, $P_H$–$P_L$.

More particularly, the EMO circuit 14 converts the capacitance of whichever of the capacitors, $C_{S1}$, $C_{S2}$, and $C_R$ are actively connected in the EMO circuit 14 to a square wave FO (frequency output) signal. The resulting FO signal has a frequency which is proportional to the capacitance of the actively connected capacitor or capacitors and is transmitted to the frequency counter 76

The EMO circuit 14 is preferably an application-specific CMOS integrated circuit. The EMO circuit 14 comprises an inverting operational amplifier 150, a bistable hysteresis amplifier 152 connected to the output of the op-amp 150, and a NAND gate 154 connected to the output of the bistable amplifier 152. The feedback circuit of the op-amp 150 is connected to the plates 130, 132, and 134 of the capacitors $C_{S1}$, $C_R$, and $C_{S2}$ via leads 90, 92 and 94, respectively. The feedback circuit of the bistable amplifier 152 controls a current source selecting switch 166. A current source 162 and an opposing current source 164 are alternately connected in the circuit depending upon the position of the selecting switch 166. The selected current source (162 or 164) is connected to the plates 130, 132, and 134 of capacitors $C_{S1}$, $C_R$, and $C_{S2}$. The common plate 114 of the sensor 12 is connected to the inverting input terminal of the op-amp 150.

The amount of frequency controlling capacitance actively connected in the EMO circuit 14 is controlled by independent single-pole switches 156, 158, and 160 in lines 90, 92, and 94, respectively. When closed, the switches 156, 158, and 160 connect the plates 130, 132, and 134, respectively, to the output of the op-amp 150. By selectively closing switches 156, 158, and 160, any combination of the capacitors $C_{S1}$, $C_R$, and $C_{S2}$ can be actively connected in the EMO circuit 14 to determine the frequency of the circuit.

The operation of the switches 156, 158, and 160 is performed by an electronic switching network operated by a switch controller, such as a dedicated mode state machine 174 or a programmable controller. The mode state machine 174 is responsive to control signals MR (master reset) and MT (master toggle) sent from the controller 78. The switching device 174, through lines $S_1$, R, and $S_2$, can selectively close any combination of the switches 156, 158, and 160 to connect to the output of the inverting amplifier 150 any combination of the capacitors $C_{S1}$, $C_R$, and $C_{S2}$. Any capacitor not connected to the output of the op-amp 150 is inactive so far as affecting frequency is concerned.

Independent single-pole switches 168, 170, and 172 are provided between capacitors $C_{S1}$, $C_R$, and $C_{S2}$, respectively, and the common capacitor plate 114. When closed, the switches 168, 170, and 172 connect the respective plates to the common capacitor plate. The mode state machine 174, via the RESET line, closes the switches 168, 170 and 172 to discharge the capacitors after every occurrence of signal MR and MT sent by the controller 78 as described below.

The mode state machine 174 is also connected to a first input of the NAND gate 154 by the RESET line. The second input of the NAND gate 154 is connected to the output of the bistable amplifier 152. When activated by the mode state machine 174, the NAND gate 154 inverts the output signal from the bistable amplifier 152.

The EMO circuit 14 operates as follows. The controller 78 sends a control signal MR to the mode state machine 174 which momentarily closes switches 168, 170, and 172 via the RESET line, discharging capacitors $C_{S1}$, $C_R$, and $C_{S2}$. After switches 168, 170, and 172 are opened again, the capacitors are then charged by the current source 162. The first input of the NAND gate 154 is set high via the RESET line.

Switch 158 is closed, actively connecting capacitor $C_R$ into the oscillating circuit (i.e., to the output of the op-amp 150). Upon switching the capacitor $C_R$ into the EMO circuit 12, the op-amp 150 will begin integrating the capacitance of the capacitor $C_R$.

Figure 7:
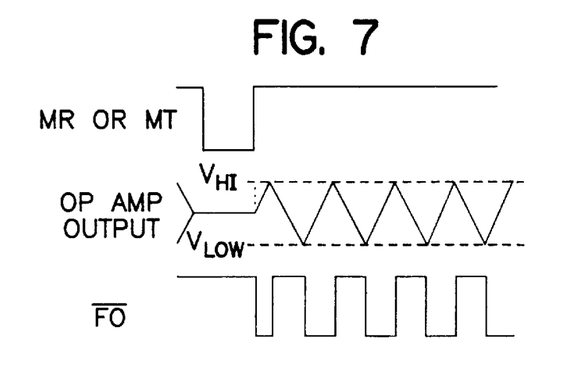
FIG. 7 is a timing diagram of the signals of an interface circuit of the present invention.
Figure 8:
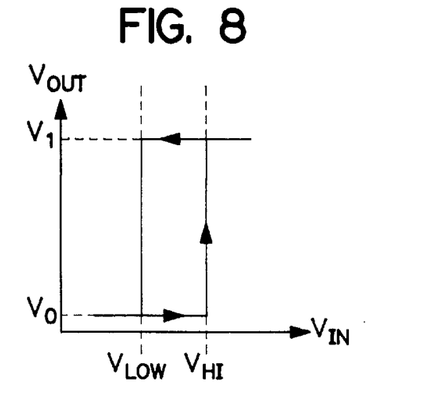
FIG. 8 is a curve showing the input and output voltages of the interface circuit.

As shown in FIGS. 7 and 8, the input voltage of the bistable amplifier 152 (and output voltage of the op-amp 150) is labelled $V_{IN}$ and the output voltage is labelled $V_{OUT}$. In normal operation, $V_{IN}$ ranges from a minimum of $V_{LOW}$ and a maximum of $V_{HI}$. These are the trigger voltages of the bistable amplifier 152. The output voltage, $V_{OUT}$, ranges from $V_0$ to $V_1$ and is initially equal to $V_0$. Since the current source 162 is initially switched into the circuit, the integrating op-amp 150 will cause $V_{IN}$ to increase, or ramp up, until it reaches $V_{HI}$.

When $V_{IN}$ equals $V_{HI}$, $V_{OUT}$ goes high to $V_1$ and the opposing current source 164 is switched into the circuit via switch 166 by the output of the amplifier 152. Consequently, the integrating op-amp 150 causes $V_{IN}$ to decrease, or ramp down, until it reaches $V_{LOW}$. When $V_{IN}$ equals $V_{LOW}$, the bistable amplifier 154 triggers to its opposite state which causes $V_{OUT}$ to go low to $V_0$, and the current source 162 is switched back into the circuit via switch 166.

Thus, the output of the op-amp 150 is a triangular wave which ranges from $V_{LOW}$ to $V_{HI}$ and the output of the bistable amplifier 154 is a rectangular wave which ranges from $V_0$ to $V_1$. The NAND gate 154 serves to invert the output of the amplifier 152. The frequency (and period) of oscillation of the square wave output of the NAND gate 154 and the triangular wave output of the op-amp 150 is a function of the capacitance of the capacitor that is switched into the circuit. The greater the capacitance, the faster the rate of change of the output voltage of the op-amp 150, $V_{IN}$. Therefore, for larger capacitance values, the EMO circuit 14 will oscillate more rapidly between the trigger voltages, $V_{HI}$ and $V_{LOW}$, and the frequency of the FO signal will be higher.

The controller 78 next sends a signal MT to the mode state machine 174. In response, the RESET signal is again asserted, discharging the capacitors. The mode state machine 174 closes switch 156, placing the capacitor $C_{S1}$ into the circuit along with the capacitor $C_R$. The op-amp 150 causes the circuit to oscillate at a frequency proportional to the capacitance of both the capacitors $C_R$ and $C_{S1}$. Another control signal MT is sent to the mode state machine 174 which again asserts the RESET signal and opens the switch 158, removing the capacitor $C_R$ from the circuit. This causes the circuit to oscillate at a frequency proportional to the capacitance of the capacitor $C_{S1}$. A last signal MT is sent to the mode state machine 174 which asserts the RESET signal and opens the switch 156 and closes the switch 160. At this point, only the capacitor $C_{S2}$ is connected in the circuit, which thus oscillates at a frequency proportional to the capacitance of the capacitor $C_{S2}$. Each of the resulting square wave signals FOCR, FOCS1+CR, FOCS1, and FOCS2 are transmitted to the frequency counter 76 for further processing.

The external connections of the EMO circuit 14 are shown in FIG. 9. The controller 78 sends digital control signals MR and MT to the EMO circuit 14 to select which capacitors to actively connect in the EMO circuit. The output signal FO for each operating mode is sampled by the external frequency counter 76 and converted to a digital number representing the period of the signal FO. The frequency counter 76 typically measures the period of the signal FO by employing a reference frequency, typically 2 to 10 MHz, which is much higher than the signal FO, so that the period of FO can be measured with sufficient resolution. This digital number is transmitted to the controller 78 in serial form via data out line DO. The data in line DI is used to read data to set up the frequency counter 76 in its preferred mode of operation. The data ready line DTA RDY indicates to the controller 78 that the information has been received by the frequency counter 76. The serial clock line SCK provides the timing for the transfer of information between the frequency counter 76 and the controller 24.

Pressure transducers typically require data rates of about 10 samples per second. In order to provide this data rate at a high resolution, the frequency counter 76 is preferably a gate frequency counter with a resolution of $2^{17}$ counts. The period of the signal FO is determined as follows. A gate time is sent to the frequency counter 76 via the serial data lines DO and DI, establishing the minimum gate time. The gate is opened by the falling edge of the first frequency output signal FO received by the frequency counter 76. The gate is closed on the first negative edge of FO after the minimum gate time has elapsed. This results in an integer number D of frequency output FO pulses. The resulting gate time is measured by the N clock pulses of the reference frequency (typically at the rate of 10 MHz). The measured period, T, is proportional to N/D.

For example, if the applied differential pressure $(P_H-P_L)$ is 0 psi, the frequency output $FO_{CR}$ transmitted when capacitor $C_R$ is actively connected is 2 kHz or 0.5 ms and the frequency output FO due to capacitors $C_{S1}$ and $C_{S2}$ would be substantially the same. For a differential pressure of 16 psi, which might typically represent full scale, the frequency output FO due to capacitor $C_R$ would remain the same but the frequency output FO due to capacitors $C_{S1}$ and $C_{S2}$ would increase to 3 kHz.

Figure 10:
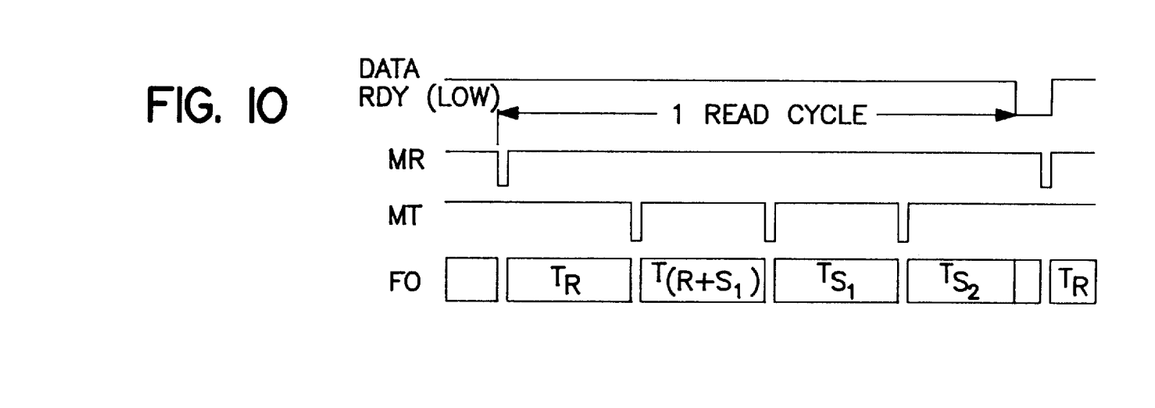
FIG. 10 is a timing diagram of one read cycle of the interface circuit.

The operation of one complete read cycle of the present device is as follows. As shown in FIG. 10, the data ready signal DTA RDY is first sent to the controller 78 indicating that the frequency counter is ready. In response, the controller transmits the MR signal to the EMO circuit 14. The switching network actively connects the capacitor $C_R$ in the EMO circuit and transmits the output frequency FO to the frequency counter 76.

The frequency counter 76 counts the number of 10 MHz reference frequency pulses in D pulses of frequency output $FO_{CR}$. Thus, if the frequency counter 76 is configured by data sent via the data in line DI to count reference frequency pulses for 10 FO pulses, D would be equal to 10 and the period of $FO_{CR}$ would be represented by a count of 10 times 10 MHz/2 kHz, or 50,000 and represent a resolution of 1 part in 50,000. The resulting period $T_R$ is sent to the controller 78 via the data output line DO.

The controller 78 then sends a control signal MT which advances the EMO circuit 14 to its next state, actively connecting capacitors $C_{S1}$ and $C_R$ in the EMO circuit 14. The resulting frequency output $FO_{CS1+CR}$ is measured and the period $T_{S1+R}$ transmitted to the controller 78 by the frequency counter 76 in the same manner. The next control signal MT causes the switching network to actively connect the capacitor $C_{S1}$ in the EMO circuit 14, followed by a third control signal MT which connects the capacitor $C_{S2}$. Thus, after one complete cycle, the four periods $T_R$, $T_{S1+R}$, $T_{S1}$, and $T_{S2}$ are transmitted and stored in the controller 78.

In order to get a redundant signal representative of the differential pressure $(P_H-P_L)$ and the compensated ratio used to calculate the pressure reading, the controller uses the four stored periods $T_R$, $T_{S1+R}$, $T_{S1}$, and $T_{S2}$. Since these periods are also sensitive to temperature, it is necessary to minimize or eliminate any parasitic capacitance caused by the temperature. An algorithm has been developed to reduce these parasitic capacitance effects and is set forth in U.S. Pat. No. 4,794,320 to Chang, the disclosure of which is hereby incorporated by reference herein.

The signal representative of differential pressure $(P_H-P_L)$ is calculated in the controller 78 according to the Chang algorithm by computing the ratio:

$$R = \frac{(T_{S_1+R} - T_{S_1})}{(T_{S_1+R} - T_R)} \approx \frac{T_R}{T_{S_1}}$$

The capacitors by their nature have systematic pressure nonlinearity caused by their geometry. Thus, the differential pressure reading, P, is determined from the ratio R, by using a polynomial to correct for the nonlinearities, and is given by:

$$P = \alpha_0 + \alpha_1 R + \alpha_2 R^2 + \alpha_3 R^3 \ldots$$

The above equation is typically a fifth order polynomial which can be used to correct for nonlinearities of the sensor 12 to within 0.01% of full scale. The measured pressure $P_X$ is a function of the capacitance of the capacitors $C_R$ and $C_{S1}$. The error, $\epsilon$, substantially uninfluenced by temperature and pressure, is calculated by:

$$\epsilon = \frac{T_R}{T_{S_1}} - \frac{T_R}{T_{S_2}}$$

The error term $\epsilon$ allows the performance of the pressure transducer 10 to be verified with a high degree of certainty by comparing the compensated capacitance of both the capacitor $C_{S1}$ and the capacitor $C_{S2}$. If the capacitors $C_{S1}$ and $C_{S2}$ are free of defects, such as particulate contamination, and have not been damaged by overstress, the error term $\epsilon$ would be close to the same value under all conditions of pressure and temperature within the specified operating range.

Using the above equations, the controller 78 consults the following diagnostic table, preferably programmed into a memory, to determine the status of the redundant pressure transducer 10.

| Condition | Position of Valve 42 | P | $\epsilon$ | Status of Sensor |
|---|---|---|---|---|
| 1 | first | $P_X$ | ≈0 | OK |
| 2 | first | $P_X$ | ≠0 | Sensor damaged/drifted |
| 3 | second | 0 | ≈0 | sensor and process diaphragms OK |
| 4 | second | 0 | ≠0 | $C_{S2}$ damaged/drifted-ignore |
| 5 | second | ≠0 | ≈0 | process diaphragms damaged-service |
| 6 | second | ≠0 | ≠0 | swap $C_{S1}$ for $C_{S2}$; if P = 0 then $C_{S1}$ is damaged; otherwise, service |

The first condition in the diagnostic table is a properly functioning pressure transmitter 10. The transmitter is indicating a measured pressure $P_X$ of the process fluid and the error term, $\epsilon$, is within tolerance. In the second condition, $\epsilon$ is not within tolerance, indicating a possible error condition. To determine the possible problems, the valve manifold 42 is moved to the second position. If the pressure transmitter is functioning properly, the differential pressure across the capacitors should now be equal to zero and error $\epsilon$ should be within tolerance. This state is shown in the third condition.

The fourth condition shows that the differential pressure, P, is accurately indicated as zero, but error $\epsilon$ is not within tolerance. In this case the capacitor $C_{S2}$ has been damaged or has drifted because P is a function of the capacitance of capacitor $C_{S1}$ only, while error $\epsilon$ is a function of the capacitance of both capacitors $C_{S1}$ and $C_{S2}$. The fifth condition shows an inaccurate pressure indication but an error $\epsilon$ which is within tolerance. When this is the case, both capacitors $C_{S1}$ and $C_{S2}$ are giving inaccurate readings, indicating that the process diaphragms 28 and 37 are damaged and that service is required.

The sixth condition shows an inaccurate pressure reading and also an error $\epsilon$ which is not within tolerance. This indicates that at least capacitor $C_{S1}$ is damaged. The capacitor $C_{S2}$ is swapped for $C_{S1}$ via software in the microprocessor and a pressure reading is determined as a function of $C_{S2}$. If the resulting pressure reading is correct then $C_{S2}$ is the only damaged component. Otherwise, there is a more serious problem and the entire pressure transmitter 10 must be serviced.

The above test is sufficient because the probability of multiple defects or damage affecting each of the capacitors $C_{S1}$ and $C_{S2}$ in exactly the same manner under all operating conditions is extremely small. Therefore, if the error $\epsilon$ remains very small under varying conditions of temperature and pressure, it can be assumed that the sensor's characterization is unchanged from the time of initial manufacture.

Additionally, the three valve manifold 42 in conjunction with the redundant sensor 12 provides a way to assure accurate and reliable operation without the need for service personnel to have access to the pressure transducer 16. Since damage or leaks in the process diaphragms 28 and 37 can cause errors undetectable by the redundant sensor 12, the problem can be isolated to the process diaphragms 28 and 37 if the error e is within tolerance yet there is a nonzero differential pressure reading when the valve manifold is placed in the second position (FIG. 2).

Figure 11:
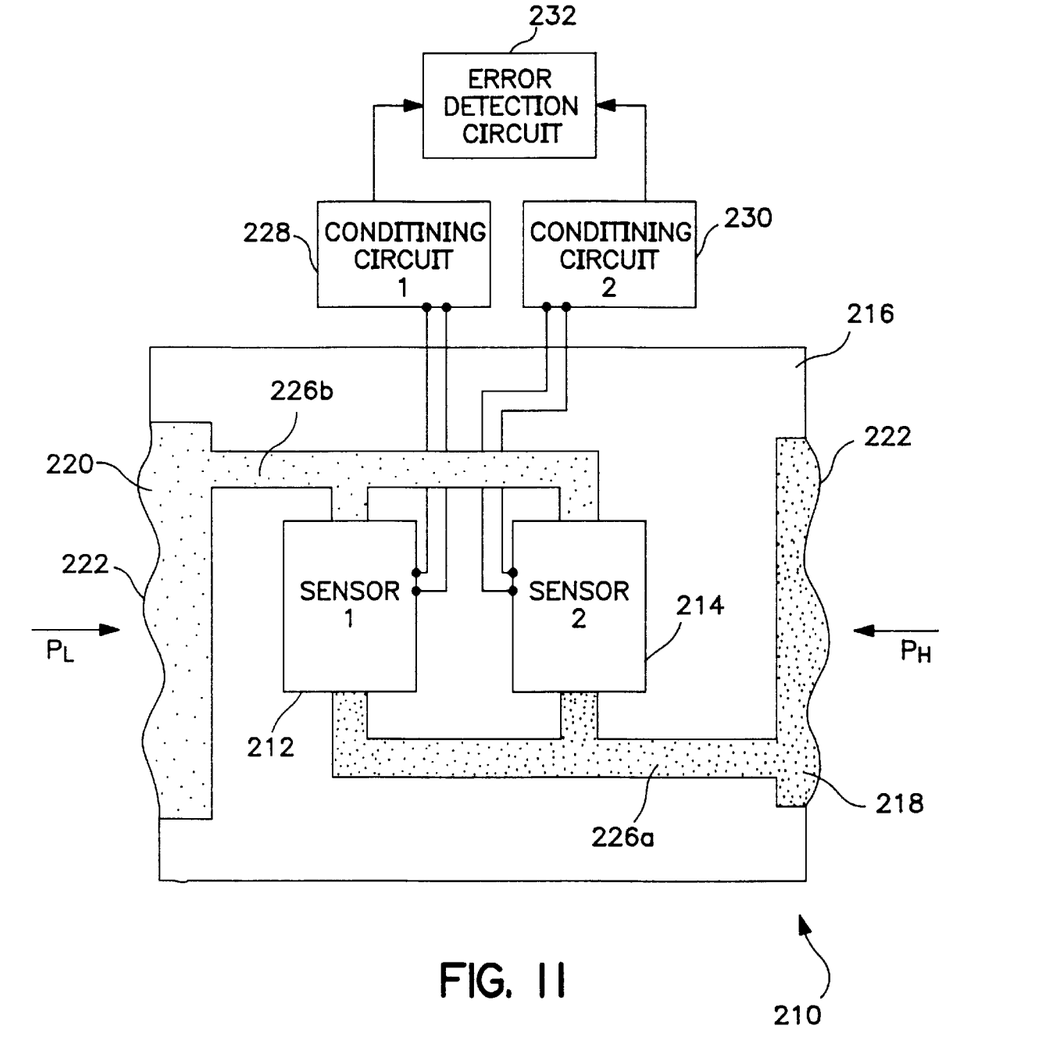
FIG. 11 is a schematic view of an alternate embodiment of the pressure transducer system having separate generic pressure sensors.

It is understood that the present invention can also be practiced with two separate substantially identical pressure sensors housed in a single transducer instead of with a monolithic sensor. In addition, a separate interface or conditioning circuit can be used with each pressure sensor to transform the output of the pressure sensor to a frequency based signal, instead of a single interface/conditioning circuit and a switching network. FIG. 11 schematically shows such an arrangement.

In FIG. 11 there is schematically shown a generic embodiment of a pressure transducer device 210 which includes a pair of separate substantially identical pressure sensors 212 and 214 mounted within a sealed housing 216. A first chamber 218 and a second chamber 220 are formed in the walls of the housing 216. The first chamber 218 is filled with an inert pressure transfer medium 226a and is in fluid communication with pressure sensors 212 and 214. Similarly, the second chamber 220 is filled with an inert pressure transfer medium 226b and is in fluid communication with pressure sensors 212 and 214. Each chamber has a seal diaphragm outer wall 222 for transferring an applied pressure to the inert transfer media therein. Thus, an applied differential pressure $P_H-P_L$ is transmitted to the pressure sensors 212 and 214 by the seal diaphragms 222 and transfer media 226a and 226b.

Each sensor 212 and 214 generates an output which is proportional to the applied differential pressure $P_H-P_L$. A first conditioning circuit 228 is electrically connected to the first sensor 212 for transforming the output of the first sensor 212 into a discrete signal. Similarly, a second conditioning circuit 230 is electrically connected to the second sensor 214 for transforming the output of the second sensor 214 into a discrete signal. The signals from each conditioning circuit 228 and 230 are compared in an error detection circuit or microprocessor 232. A significant deviation between the two signals indicates the presence of sensor defects or damage. Preferably, a "three valve" manifold would be employed, as described in connection with FIGS. 1–11, to pinpoint the source of any error.

The sensors 212 and 214 can be any type of pressure sensor responsive to applied differential pressure. Suitable pressure sensors are capacitive sensors, resonant sensors, strain gauge sensors, or the like. In addition, each sensor could also include a reference sensor to compensate for non-linearities caused by temperature variations and parasitic effects.

Figure 12:
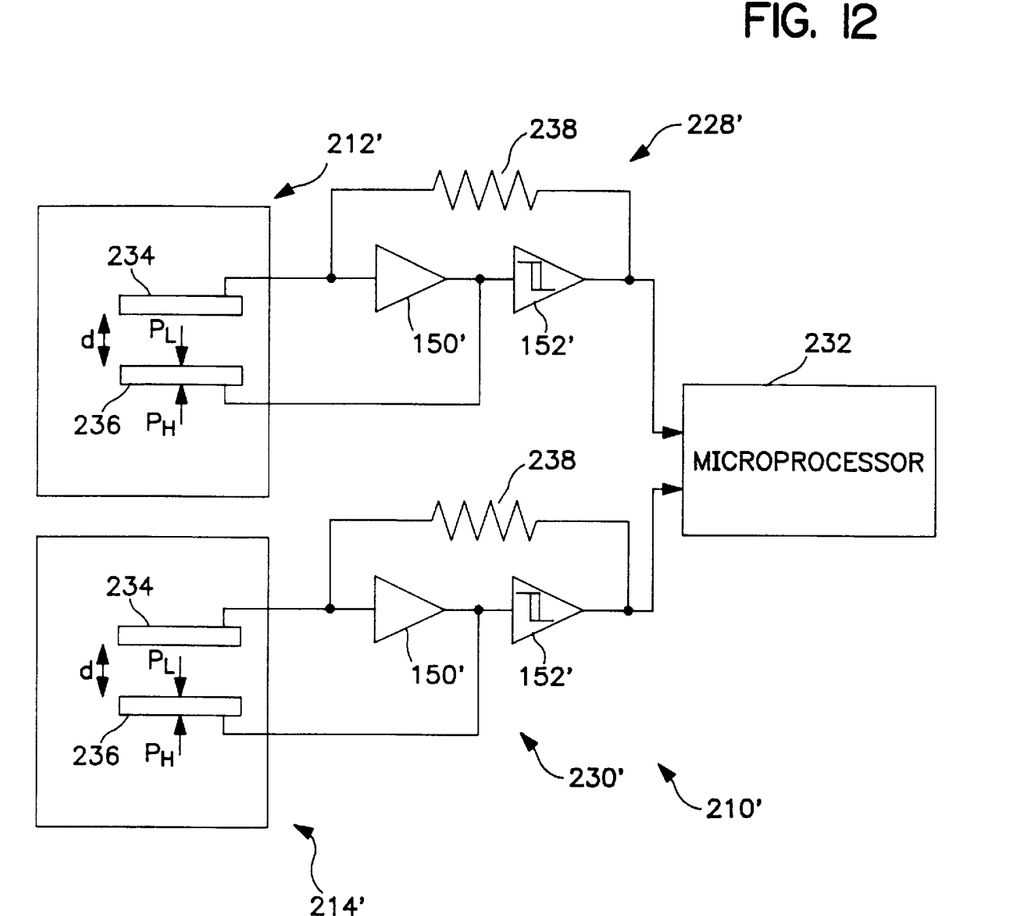
FIG. 12 is a schematic view of a first specific embodiment of the pressure transducer system of FIG. 11 having capacitive pressure sensors.

In FIG. 12 there is schematically illustrated a first embodiment of the pressure transducer device 210'. The pressure sensors of device 210' are capacitive pressure sensors 212' and 214'. Each capacitor 212' and 214' has a fixed plated 234 and a movable plate 236. The differential pressure, $P_H-P_L$, is applied to each movable plate 236, deflecting each. The change in distance, d, between the plates of the capacitors 212' and 214' causes a change in capacitance proportional to the differential pressure, $P_H-P_L$.

Each capacitor 212' and 214' is electrically connected to a separate conditioning circuit 228' and 230', respectively. The conditioning circuits 228' and 230' are similar to the EMO circuit 14 (without the switching network) and function in a similar manner.

The conditioning circuits 228' and 230' each comprise an inverting operational amplifier 150 and a bistable hysteresis amplifier 152 connected to the output of the op-amp 150. The feedback circuit of the op-amp 150 is connected to the movable plate 236 of each respective capacitor 212' and 214'. The output of the bistable amplifier is fed back through a feedback resistance 238 to the input of the op-amp 150. The fixed plate 234 of each capacitor 212' and 214' is connected to the inverting input terminal of the respective op-amp 150. In this way, circuit 228' oscillates at a frequency proportional to the capacitance of capacitor 212' and circuit 230' oscillates at a frequency proportional to the capacitance of capacitor 214'. The microprocessor or error detection circuit 232 compares the signals from circuits 212' and 214' to monitor for drift or damage.

Figure 13:
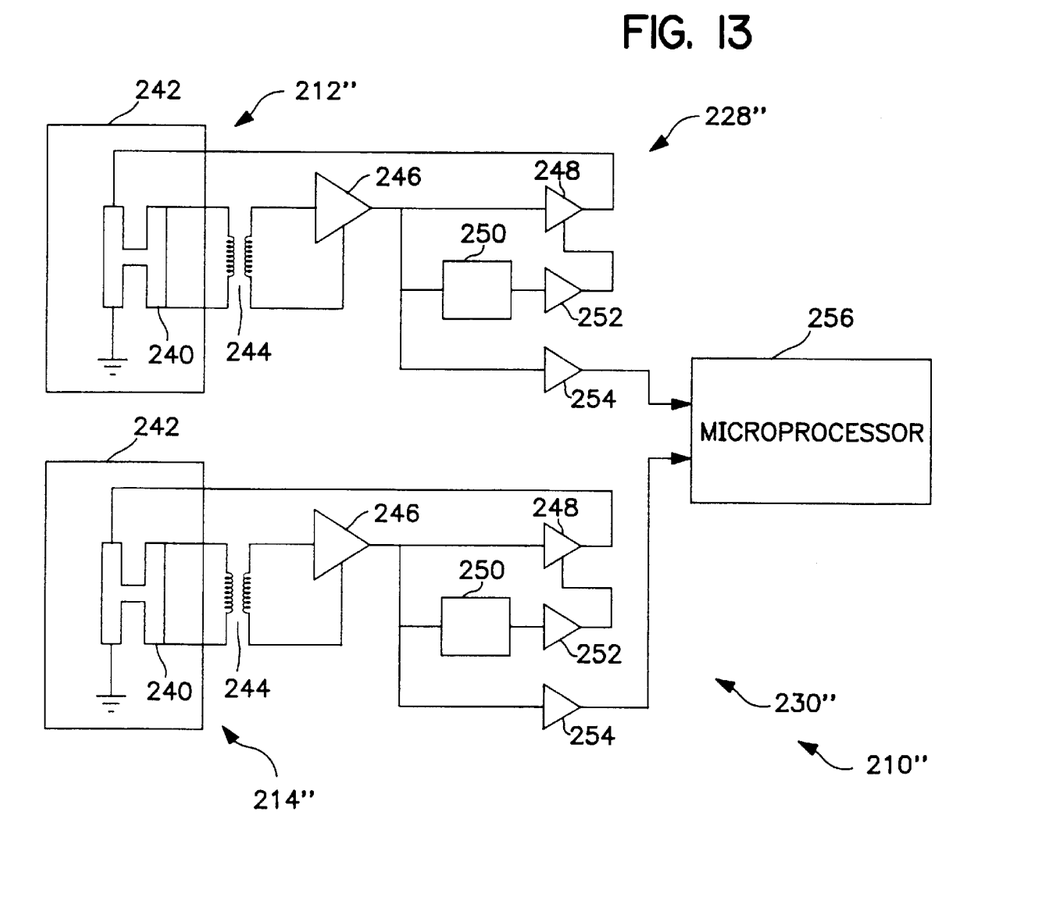
FIG. 13 is a schematic view of a second specific embodiment of the pressure transducer system of FIG. 11 having resonant pressure sensors.

FIG. 13 schematically shows a second specific embodiment of the pressure transducer device 210". The pressure sensors of device 210" are resonant pressure sensors 212" and 214". Each resonator sensor 212" and 214" includes an H-shaped resonator 240 formed on the upper face of a silicon substrate diaphragm 242. A magnetic field is horizontally applied by a permanent magnet (not shown) adjacent the resonator 240. The resonator oscillates according to the principle of electromagnetic induction. One component of the differential pressure, $P_H-P_L$ is applied to each face of the diaphragm 242, elastically deforming it. This generates a strain in the resonator 240, changing its resonant frequency in proportion to the differential pressure, $P_H-P_L$.

The relationship between the applied differential pressure $P_H-P_L$ and the resonant frequency $f$ of the resonator 240 is given by the following equations:

$$\epsilon = \frac{Kr^2}{t^2(\Delta P)}$$

$$f = \frac{4.73^2 h}{2\pi l} \sqrt{\frac{E}{12\rho}\left(1 + 0.2366\left(\frac{1}{h}\right)^2 \epsilon\right)}$$

where

ε is the strain in the resonator
K is a constant
r, t are diaphragm radius and thickness
ΔP is the applied differential pressure ($P_H-P_L$)
$f$ is the resonant frequency p1 h, l are the resonator thickness and length
E is Young's modulus for silicon
ρ is the density of silicon Conditioning circuits 228" and 230" are electrically connected to each resonator sensor 212" and 214", respectively. The conditioning circuit excites the resonator 240 and detects its resonant frequency. Preferably the conditioning circuit is implemented as a dedicated application specific integrated circuit.

The conditioning circuits, 228" and 230" each comprise a transformer 244 for separating the resonator 240 output DC voltage component. The AC component of the resonator 240 output is amplified by a preamplifier 246. The preamplifier 246 output is fed back to the resonator 240 input terminal via a variable voltage-current circuit (amplifier) 248.

The output of the preamplifier 246 is also branched to an automatic gain control circuit 250. The output of the automatic gain control circuit 250 is amplified by amplifier 252 and fed into the amplifier 248. This results in stable oscillation of the resonator 240 at a constant amplitude.

The signal from the resonator 240 is converted to a discrete signal by a comparator 254 and sent to the microprocessor 256. The microprocessor 256 compares the signals from each circuit 212" and 214" to monitor for drift or damage.

It is understood that the resonator sensors 212" and 214" can also be formed as a redundant monolithic sensor on a single substrate.

Figure 14:
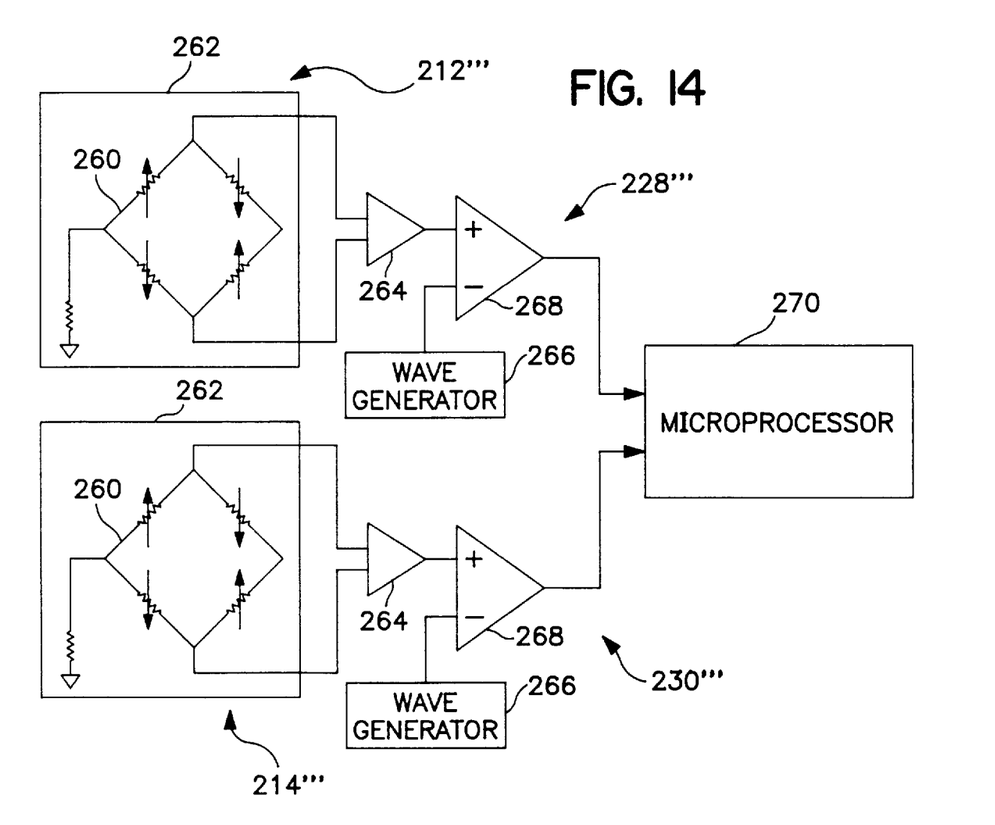
FIG. 14 is a schematic view of a third specific embodiment of the pressure transducer system of FIG. 11 having a strain gauge pressure sensors.

FIG. 14 schematically shows a third embodiment of the pressure transducer device 210'''. The sensors of device 210''' are strain gauge sensors 212''' and 214'''. Each strain gauge sensor 212''' and 214''' includes a strain gauge 260 attached to a diaphragm 262.

One component of the differential pressure, $P_H-P_L$ is applied to each face of the diaphragm 262, elastically deforming it. This causes the strain to change in the strain gauge 260, causing a change in the resistance in each resistor of the strain gauge 260. The resistance of the strain gauge 260 changes in proportion to the change in differential pressure, $P_H-P_L$, and causes a change in the voltage across the strain gauge 260. The voltage across each strain gauge 260, which is also proportional to the differential pressure, $P_H-P_L$, is output to a conditioning circuit.

Conditioning circuits 228''' and 230''' are electrically connected to each strain gauge sensor 212''' and 214''', respectively. The output from the strain gauge 260 is amplified by a preamplifier 264. The output of the preamplifier 264 is converted to a discrete signal by a wave generator 266 and a comparator 268. The microprocessor 270 compares the discrete signals from each circuit 228''' and 230''' to monitor for drift or damage.

It is understood that the strain gauge sensors 212''' and 214''' can also be formed as a redundant monolithic sensor on a single substrate.

The present invention may be embodied in other specific forms without departing from the spirit or essential attributes thereof and, accordingly, reference should be made to the appended claims, rather than to the foregoing specification, as indicating the scope of the invention.

We claim:

1. A pressure transducer comprising:

a capacitive sensor having first and second variable capacitors for providing a variable capacitance as a function of a differential fluid pressure and a reference capacitor for providing a fixed capacitance independent of the differential fluid pressure, the first and second capacitors each having one fixed plate and one movable plate responsive to differential fluid pressure across the movable plate, the reference capacitor having two fixed plates, the first variable, second variable, and reference capacitors all being located in proximity to one another and in communication with the differential fluid pressure; and a switching network connected to the capacitors for selectably connecting at least one of the capacitors to an electronic circuit via the switching network for generating a frequency-based signal whose frequency is a function of the capacitance of the at least one capacitor connected to the electronic circuit through the switching network.

2. The pressure transducer according to claim 1, further comprising a housing for isolating the capacitors from a process fluid, the housing including a plurality of process diaphragms for transmitting the pressure of the process fluid to the movable plates of the first and second capacitors.

3. The pressure transducer according to claim 1, wherein the movable plate of the first variable capacitor, the movable plate of the second variable capacitor, and one of the fixed plates of the reference capacitor are formed from a semiconductor substrate which forms a common capacitor plate.

4. The pressure transducer according to claim 3, wherein the fixed plate of the first variable capacitor, the fixed plate of the second variable capacitor, and the other fixed plate of the reference capacitor are located on a first dielectric plate.

5. The pressure transducer according to claim 4, further comprising a second dielectric plate, the common capacitor plate being interposed between the first and second dielectric plates.

6. The pressure transducer according to claim 1, wherein the second variable capacitor is substantially identical to the first variable capacitor.

7. The pressure transducer according to claim 1, further comprising a three valve manifold in fluid communication with the capacitive sensor for selectively applying a zero-pressure differential to the capacitive sensor.

8. The pressure transducer according to claim 1, wherein the electronic circuit comprises an oscillator for generating the frequency-based signal.

9. The pressure transducer according to claim 1, wherein the switching network connects the first variable capacitor only, and the reference capacitor only, to the electronic circuit in a preselected sequence, and the electronic circuit generates a first signal whose frequency is a function of the capacitance of the first variable capacitor and a second signal whose frequency is a function of capacitance of the reference capacitor.

10. The pressure transducer according to claim 1, wherein the switching network connects the first variable capacitor only, the reference capacitor only, and both the first variable capacitor and the reference capacitor to the electronic circuit in a preselected sequence, and the electronic circuit generates a first signal whose frequency is a function of the capacitance of the first variable capacitor, a second signal whose frequency is a function of capacitance of the reference capacitor, and a third signal whose frequency is a function of the capacitance of both the first capacitor and the reference capacitor.

11. The pressure transducer according to claim 1, wherein the switching network connects the only first variable capacitor, only the reference capacitor, and only the second variable capacitor to the electronic circuit in a preselected sequence, and the electronic circuit generates a first signal whose frequency is a function of the capacitance of the first variable capacitor, a second signal whose frequency is a function of capacitance of the reference capacitor, and a third signal whose frequency is a function of the capacitance of the second variable capacitor.

12. A capacitive sensor comprising:

first and second variable capacitors for providing a variable capacitance as a function of a differential fluid pressure applied thereto and a reference capacitor for providing a fixed capacitance independent of differential fluid pressure applied thereto, the first and second variable capacitors each having one fixed plate and one movable plate responsive to differential fluid pressure across the movable plate, the reference capacitor having two fixed plates with respect to the first and second variable capacitors, the first variable, second variable, and reference capacitors all being located in proximity to one another and in communication with the differential fluid pressure.

13. The capacitive sensor according to claim 12, wherein the second capacitor is substantially identical to the first capacitor.

14. The capacitive sensor according to claim 13, wherein the movable plate of the first variable capacitor, the movable plate of the second variable capacitor, and one of the fixed plates of the reference capacitor are formed from a semiconductor substrate which forms a common capacitor plate.

15. The capacitive sensor according to claim 14 wherein the fixed plate of the first variable capacitor, the fixed plate of the second variable capacitor, and the other fixed plate of the reference capacitor are located on a first dielectric plate.

16. The capacitive sensor according to claim 15 further comprising a second dielectric plate, the common capacitor plate being interposed between the first and second dielectric plates.

17. The capacitive sensor according to claim 16, further comprising a base plate formed from a semiconductor substrate and attached to the second dielectric plate.

* * * * *